United States Patent
Klimek et al.

(10) Patent No.: US 6,217,054 B1
(45) Date of Patent: Apr. 17, 2001

(54) HITCH

(76) Inventors: David L. Klimek, 1423 N. Howard Pl., Grand Island, NE (US) 68803; Gary R. Nickels, R.R. #1, Chapman, NE (US) 68827

( * ) Notice: Subject to any disclaimer, the term of this patent is extended or adjusted under 35 U.S.C. 154(b) by 0 days.

(21) Appl. No.: 09/356,823

(22) Filed: Jul. 19, 1999

(51) Int. Cl.$^7$ .................................................. B60D 1/173
(52) U.S. Cl. ........................................ 280/511; 280/416.1
(58) Field of Search ................................ 280/511, 415.1, 280/416.1, 491.5, 504

(56) References Cited

U.S. PATENT DOCUMENTS

| | | |
|---|---|---|
| 1,636,295 | 7/1927 | Dempsey . |
| 2,321,535 | * 6/1943 | Weiss ..................................... 280/506 |
| 2,475,780 | 7/1949 | Fearnehough . |
| 2,628,050 | 2/1953 | Hardwick . |
| 2,984,502 | * 5/1961 | Tyrrell ..................................... 280/506 |
| 3,061,334 | 10/1962 | Everett et al. . |
| 3,159,368 | 12/1964 | Ahlbin et al. . |
| 3,900,214 | * 8/1975 | Brockelsby ........................ 280/414.1 |
| 4,360,217 | 11/1982 | Pittman . |
| 4,786,119 | 11/1988 | Smuda . |
| 5,219,435 | 6/1993 | Sprunger . |
| 5,433,467 | 7/1995 | Easterwood . |
| 5,671,938 | 9/1997 | Olson . |

* cited by examiner

*Primary Examiner*—Kevin Hurley
*Assistant Examiner*—Andrew J. Fischer
(74) *Attorney, Agent, or Firm*—Zarley, McKee, Thomte, Voorhees & Sease; Dennis L. Thomte

(57) ABSTRACT

A hitch is mounted on the rear end of a rearwardly extending tow bar of a towing vehicle, with the tow bar having a hitch ball secured thereto. The hitch comprises a first plate which is secured at its rearward end to the forward end of the upper clevis element of the towed vehicle. The first plate has a circular-shaped opening formed therein which is adapted to receive the ball sphere of the hitch ball. The first plate also has a slot formed therein which extends forwardly from the circular opening which is adapted to receive the shank of the hitch ball. A second plate is slidably movably mounted on the first plate between rearward and forward positions. The forward end of the second plate has a semi-circular opening formed therein which is positioned beneath the ball sphere of the hitch ball when the second plate is in its forward position. A retaining pin extends through the first and second plates when the second plate is in its forward position to maintain the hitch on the hitch ball.

14 Claims, 3 Drawing Sheets

HITCH

BACKGROUND OF THE INVENTION

1. Field of the Invention

This invention relates to a hitch and more particularly to a hitch which is installed on the tongue of a trailer, or other device, to enable the trailer, or other device, to be secured to the rearwardly extending tow bar of a towing vehicle.

2. Description of the Related Art

Garden tractors and all terrain vehicles (ATVs) are frequently used to tow trailers, sprayers, fertilizer spreaders, etc. Normally, the device being towed has a forwardly extending tongue with a clevis-like hitch at its forward end which is secured to the rearwardly extending tow bar of the towing vehicle by means of a hitch pin. Once the hitch pin has been extended through the tongue hitch and tow bar, it is normally necessary to crawl under the vehicle or tongue to extend a retaining pin through the lower end of the hitch pin to ensure that the tongue hitch will not become disconnected from the tow bar. Further, the conventional type of hitch just described provides a certain amount of play therein due to the fact that the thickness of the tow bar is normally considerably less than the distance between the upper and lower clevis elements of the hitch.

SUMMARY OF THE INVENTION

The hitch of this invention is designed to be used in conjunction with a towing vehicle having a rearwardly extending tow bar with a hitch ball secured thereto with the hitch ball including a ball sphere having a threaded shank extending downwardly therefrom which is received in an opening by the tow bar and which is secured therein by a nut on the threaded shank below the tow bar for maintaining the hitch ball on the tow bar. The hitch of this invention comprises a first plate having rearward and forward ends, and upper and lower sides. The first plate is provided with one or more openings at its rearward end for receiving bolts extending therethrough to secure the first plate to the tongue of the towed vehicle. The first plate has a generally circular-shaped opening formed therein at its forward end for receiving the ball sphere. The first plate also has an elongated slot formed therein which extends forwardly from the circular-shaped opening for receiving the shank of the hitch ball. A second plate having rearward and forward ends is selectively slidably mounted on the upper side of the first plate with the second plate being movable between a forward position and a rearward position with respect to the first plate. The forward end of the second plate has a semi-circular opening formed therein which at least partially receives the lower portion of the ball sphere and the shank below the ball sphere when the second plate is in its forward position to prevent the hitch from being detached from the hitch ball. A removable pin extends through the first and second plates to maintain the second plate in its forward position.

It is therefore a principal object of the invention to provide an improved hitch device.

It is a further object of the invention to provide a hitch device which is secured to the forward end of the tongue of a towed vehicle or device which is quickly and easily secured to a hitch ball mounted on the rearward end of the tow bar of the towing vehicle.

Still another object of the invention is to provide a hitch which is safe to use.

Still another object of the invention is to provide a hitch device which prevents excessive movement between the hitch device and the hitch ball mounted on the tow bar of the towing vehicle.

Still another object of the invention is to provide a hitch device of the type described above which is refined in appearance and durable in use.

These and other objects will be obvious to those skilled in the art.

DESCRIPTION OF THE PREFERRED EMBODIMENT

Figure 1:
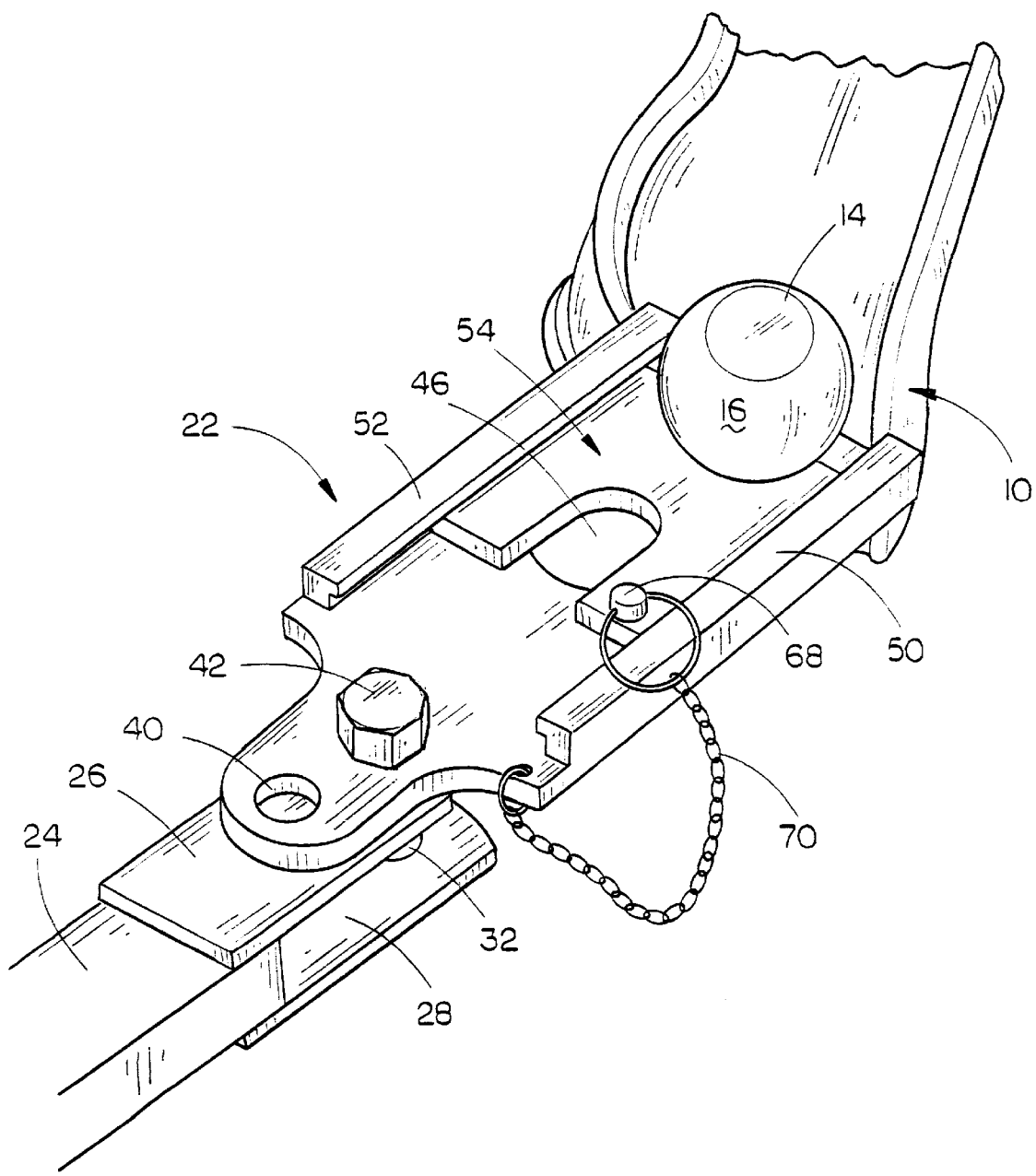
FIG. 1 is a rear perspective view of the hitch mounted on a forwardly extending tongue with the hitch being secured to a hitch ball on the tow bar of the towing vehicle.

The numeral 10 refers to a rearwardly extending tow bar of a towing vehicle such as a tractor or ATV. The tow bar 10 is provided with an opening 12 formed in its rearward end which normally receives a hitch pin or the like therein to connect a towed vehicle or device thereto. For the purposes of this invention, a hitch ball 14 including a ball sphere 16 and threaded shank 18 extending downwardly therefrom is employed on the tow bar 10. Shank 18 of hitch ball 14 is extended through the opening 12 and secured therein by means of a nut 20.

The hitch, hitch device or coupling device of this invention is referred to generally by the reference numeral 22 and is adapted to be mounted on the forward end of a tongue 24 of a towed vehicle or device. Tongue 24 includes upper clevis element 26 and lower clevis element 28 having openings 30 and 32 formed therein, respectively.

Figure 2:
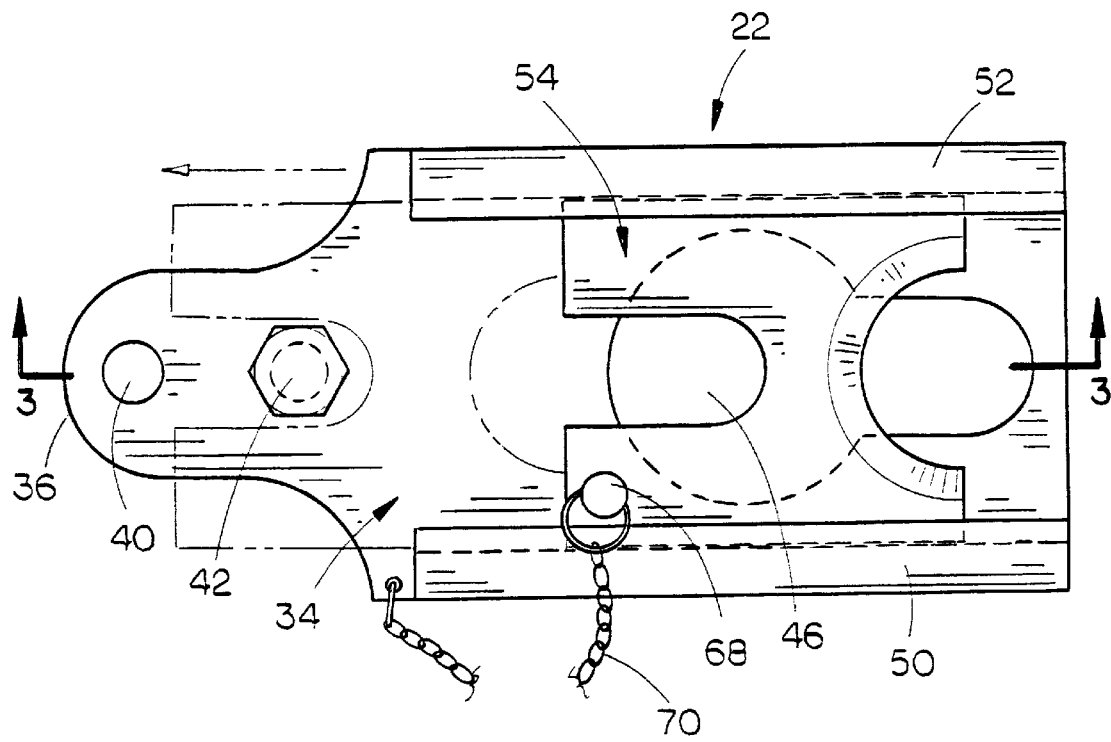
FIG. 2 is a top elevational view of the hitch of this invention.
Figure 3:
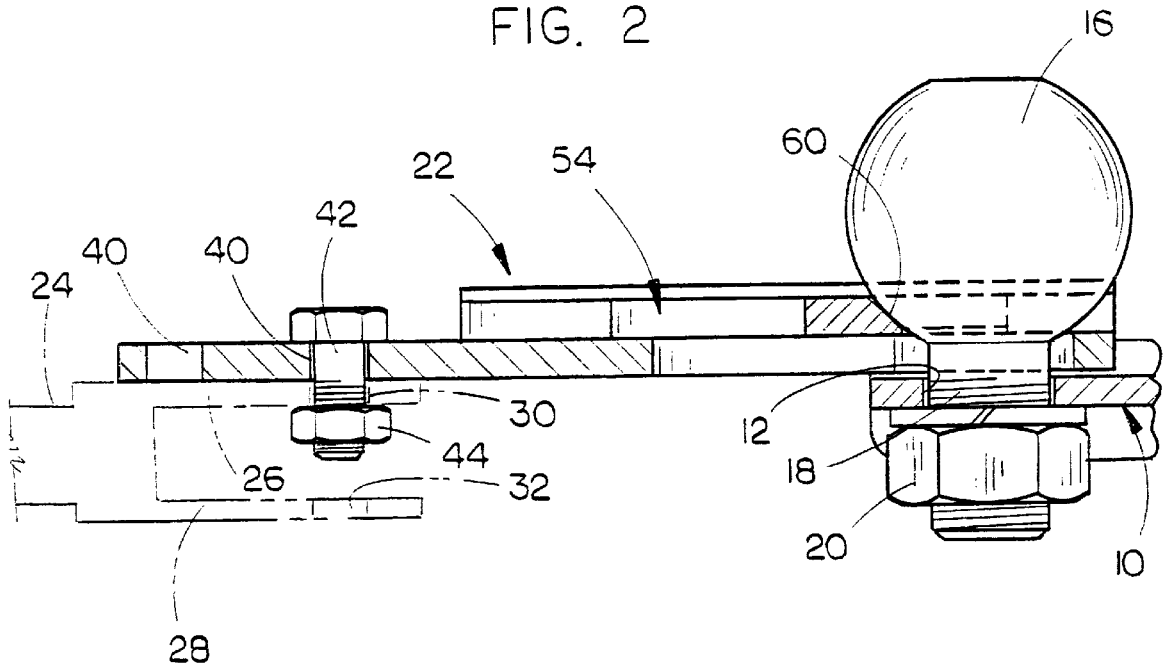
FIG. 3 is a sectional view as seen on lines 3—3 of FIG. 2.
Figure 4:
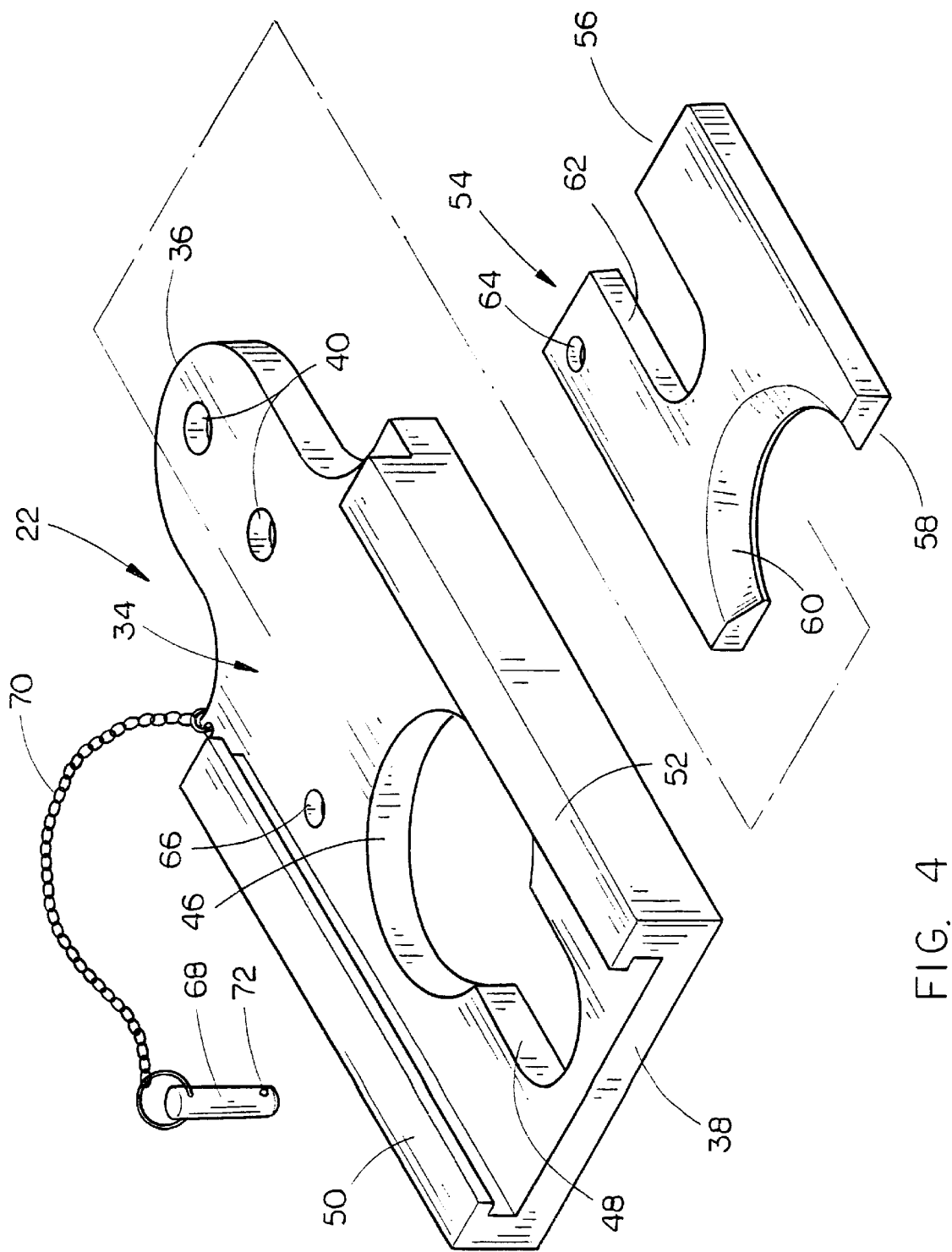
FIG. 4 is an exploded perspective view of the hitch of this invention.

Hitch 22 includes a first plate 34 having a rearward end 36 and a forward end 38. The rearward end 36 of plate 34 has one or more openings 40 formed therein for connecting the plate 34 to the upper clevis element 26 by means of bolt 42 extending through one of the openings 40 and through the opening 30 in upper clevis element 26 with the bolt 42 being secured therein by means of a nut 44. Plate 34 is provided with a semi-circular opening 46 formed therein at its forward end 38 which is adapted to receive the ball sphere 16 therein as will be described in greater detail hereinafter. Plate 34 is also provided with a slot 48 which extends forwardly from the forward end of opening 46 which is adapted to receive the shank 18 of the hitch ball 14, as will also be described in greater detail hereinafter. Plate 34 is provided with channels 50 and 52 at its side edges which are adapted to slidably receive the edges of the second plate 54. Plate 54 includes a rearward end 56 and a forward end 58. Plate 54 is provided with a semi-circular opening 60 formed therein at its forward end 58 and which is beveled as illustrated in the drawings. A U-shaped slot 62 is formed in the rearward end of plate 54 and is adapted to receive the head of the bolt 42 therein when the plate 54 is in its rearward position as illustrated in FIG. 2. When the plate 54 is in its forward position (FIG. 3), the beveled edge of the semi-circular opening 60 is positioned beneath the ball sphere 16. Plate 54 has an opening 64 formed therein which is adapted to register with the opening 66 formed in plate 34 when the plate 54 is in its forward position so that a retaining pin 68 may be extended therethrough to maintain the plate 54 in its forward position. Preferably, pin 68 has a chain 70 secured thereto to prevent the pin from being lost.

The hitch of this invention is installed and used as follows. Hitch ball 14 is mounted on the rearwardly extending tool bar 10 with the shank 18 extending through the opening 12 to enable the hitch ball 14 to be secured to the tow bar 10 by means of nut 20. The hitch 22 is secured to upper clevis element 26 by means of bolt 42 extending through one of the openings 40 in plate 34. If desired, an additional hole may be drilled in the upper clevis element 26 so that a bolt may be extended through the other opening 40 and into the newly drilled hole or opening in the upper clevis element 26 to further stabilize the hitch.

Pin 68 is removed from openings 64 and 66 to enable the plate 54 to be slidably moved rearwardly with respect to plate 34 to fully expose the opening 46 and slot 48 in plate 34. The U-shaped opening 62 in plate 54 receives the head of the bolt 42 to enable the plate 54 to be moved to its rearward position. The engagement of the head of the bolt 42 with the U-shaped opening 62 also prevents the plate 54 from moving from the rearward end of the plate 34.

When the plate 54 has been slidably moved to its rearward position, the tongue 24 is raised and maneuvered so that the hitch device may be lowered onto the hitch ball 14 with the sphere 16 being received by the opening 46. When the plate 34 has been positioned on the tow bar 10 with the hitch ball 14 extending upwardly through the opening 46, the tongue 24 is moved rearwardly with respect to the tow bar 10 so that the slot 48 receives the shank 18 of hitch ball 14. Plate 54 is then slidably moved to its forward position (FIG. 3) so that the semi-circular opening 60 is positioned beneath the rearward end of the ball sphere 16 with the beveled edge thereof generally conforming to the circumference of the ball sphere 16 to reduce the play or clearance therebetween. Pin 68 is then extended through the openings 64 and 66 and is held therein by a conventional detent 72 at the lower end of the pin 68.

The hitch 22 of this invention is quickly and easily connected to the hitch ball 14 on the tow bar 10 without the necessity of crawling beneath the tow bar 10 to extend a retaining key or the like through the lower end of the conventional hitch pin, as is commonly required by the prior art devices. The hitch of this device is easy to use and permits the tongue, with the hitch 22 mounted thereon, to pivot with respect to the hitch ball 14 as the towing vehicle or towed device is maneuvered. Further, the design of the hitch 22 permits relative vertical movement between the towing and towed vehicles.

It can therefore be seen that the invention accomplishes at least all of its stated objectives.

We claim:

1. In combination:

a towing vehicle, having a rearwardly extending tow bar which has a first opening formed therein at the rearward end thereof;

a hitch ball including a ball sphere having a threaded shank extending downwardly therefrom which is received in said first opening;

a nut on said threaded shank below said tow bar for maintaining said hitch ball on said tow bar;

a towed vehicle including a forwardly extending tongue;

a coupling device mounted on the forward end of said tongue for coupling said tongue to said hitch ball;

said coupling device comprising:

(a) a first plate having rearward and forward ends, and upper and lower sides;

(b) said first plate having means at its rearward end for securing said first plate to said tongue;

(c) said first plate having a generally circular-shaped opening formed therein at the forward end thereof for receiving said ball sphere;

(d) said first plate having an elongated slot formed therein which extends forwardly from said circular-shaped opening for receiving said shank;

(e) a second plate, having rearward and forward ends, selectively slidably mounted on said upper side of said first plate;

(f) said second plate being movable between a forward position and a rearward position with respect to said first plate;

(g) said forward end of said second plate having a semi-circular opening formed therein which at least partially receives said shank below said ball sphere when said second plate is in its said forward position to prevent said coupling device from being detached from said hitch ball;

(h) and means for securing said second plate in its said forward position.

2. The combination of claim 1 wherein said first plate has opposite side edges and wherein said first plate has channel members at its said opposite sides which slidably receive said second plate.

3. The combination of claim 1 wherein said semi-circular opening has a beveled upper edge.

4. The combination of claim 1 wherein said means for securing said second plate in its said forward position comprises a pin which extends through said first and second plates.

5. The combination of claim 4 wherein said pin is selectively removable.

6. The combination of claim 1 wherein said first plate is secured to said tongue by means of a bolt and wherein said rearward end of said second plate has a slot, having rearward and forward ends, which receives said bolt when said second plate is in its said rearward position.

7. The combination of claim 6 wherein the engagement of said bolt with said forward end of said slot in said second plate prevents said second plate from being detached from said first plate.

8. In combination with a towing vehicle having a rearwardly extending tow bar which has a first opening formed therein at the rearward end thereof, a hitch ball mounted on the tow bar including a ball sphere having a threaded shank extending downwardly therefrom which is received in said opening, a nut on the threaded shank maintaining the hitch ball on the tow bar, and a towed vehicle including a forwardly extending tongue:

a hitch mounted on the forward end of the tongue for hitching the tongue to the hitch ball;

said hitch comprising:

(a) a first plate having rearward and forward ends, and upper and lower sides;

(b) said first plate having means at its rearward end for securing said first plate at the tongue;

(c) said first plate having a generally circular-shaped opening formed therein at the forward end thereof for receiving said ball sphere;

(d) said first plate having an elongated slot formed therein which extends forwardly from said circular-shaped opening for receiving said shank;

(e) a second plate, having rearward and forward ends, selectively slidably mounted on said upper side of said first plate;

(f) said second plate being movable between a forward position and a rearward position with respect to said first plate;

(g) said forward end of said second plate having a semi-circular opening formed therein which at least partially receives said shank below said ball sphere when said second plate is in its said forward position to prevent said coupling device from being detached from said hitch ball;

(h) and means for securing said second plate in its said forward position.

9. The combination of claim 8 wherein said first plate has opposite side edges and wherein said first plate has channel members at its said opposite sides which slidably receive said second plate.

10. The combination of claim 8 wherein said semi-circular opening has a beveled upper edge.

11. The combination of claim 8 wherein said means for securing said second plate in its said forward position comprises a pin which extends through said first and second plates.

12. The combination of claim 11 wherein said pin is selectively removable.

13. The combination of claim 8 wherein said first plate is secured to said tongue by means of a bolt and wherein said rearward end of said second plate has a slot, having rearward and forward ends, which receives said bolt when said second plate is in its said rearward position.

14. The combination of claim 13 wherein the engagement of said bolt with said forward end of said slot in said second plate prevents said second plate from being detached from said first plate.

* * * * *